(No Model.)

H. S. BLACKMORE.
PROCESS OF AND APPARATUS FOR DISSOCIATING SOLUBLE SALTS BY ELECTROLYSIS.

No. 510,834. Patented Dec. 12, 1893.

WITNESSES:
Edward Wolff
William Miller

INVENTOR:
Henry S. Blackmore.
BY
Hauff + Hauff
ATTORNEYS.

UNITED STATES PATENT OFFICE.

HENRY S. BLACKMORE, OF MOUNT VERNON, NEW YORK.

PROCESS OF AND APPARATUS FOR DISSOCIATING SOLUBLE SALTS BY ELECTROLYSIS.

SPECIFICATION forming part of Letters Patent No. 510,834, dated December 12, 1893.

Application filed March 16, 1893. Serial No. 466,343. (No model.)

*To all whom it may concern:*

Be it known that I, HENRY S. BLACKMORE, a citizen of the United States, residing at Mount Vernon, in the county of Westchester and State of New York, have invented new and useful Improvements in Processes of and Apparatus for Dissociating Soluble Salts by Electrolysis, of which the following is a specification.

This invention is based on the discovery that the dissociation of soluble salts by electrolysis can be effected with great facility by providing a bath of the electrolyte and two independent bodies of liquid, establishing a dialytic communication between the bath and each of the independent bodies of liquid, maintaining the independent bodies of liquid at a higher level than the level of the bath, and passing a current of electricity through the independent bodies and through the bath.

The apparatus which I have constructed for the purpose of carrying out my invention is illustrated in the accompanying drawings in which—

Figure 1:
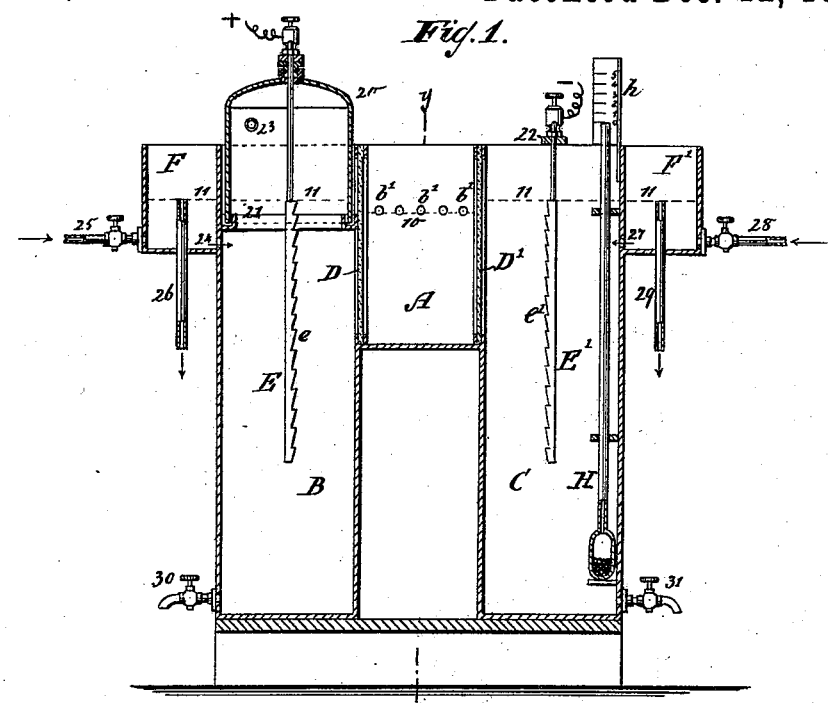
Figure 2:
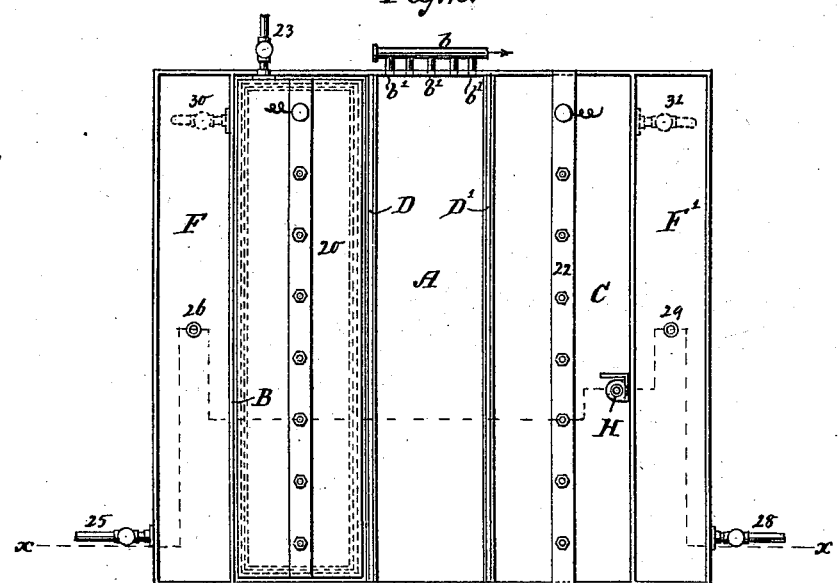
Figures 3, 4:
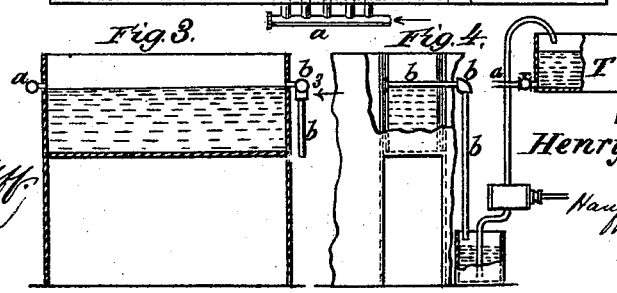

Figure 1 represents a transverse vertical section in the plane $x$ $x$ Fig. 2. Fig. 2, is a plan or top view. Fig. 3 is a vertical longitudinal section in the plane $y$ $y$ Fig. 1, on a smaller scale than the previous figures. Fig. 4 is a sectional side elevation looking in the direction of arrow 3 (Fig. 3).

In the drawings the letter A designates a tank which communicates with a pipe $a$ through which the electrolyte is introduced and also with a pipe $b$ which communicates with the tank by branch pipes $b'$ and serves to carry away the surplus liquid so as to maintain a constant level of the liquid in the tank A, such level being indicated by the dotted line 10 in Fig. 1. The pipes $a$ and $b$ communicate with the tank A at the same level and the pipe $a$ may run in a horizontal direction and be connected to the bottom part of a supply tank T containing the electrolyte and extending above the level of the tank A as shown in Fig. 4, or it may be connected to a pump or other equivalent device suitable for the purpose of forcing the electrolyte through the pipe $a$ into the tank A. The surplus liquid which escapes through the pipe $b$ need not be wasted but it can be collected and fed into the tank A through the pipe $a$ as indicated in Fig. 4. The tank A communicates with a tank B by means of a dialytic diaphragm D', and in the example illustrated by the drawings these diaphragms extend down to the bottom of the tank A or nearly so, while the tanks B C extend below the bottom of the tank A.

E E' are two electrodes one of which is situated in the tank B and the other in the tank C. These electrodes extend below the level of the bottom edges of the dialytic diaphragms D D' and they are provided with upwardly pointed teeth or ridges $e$ $e'$. The electrode E is secured to a cover or dome 20 which is provided with an escape opening 23 and fits into a grooved flange 21 secured in the interior of the tank and situated below the water line 11 so that a liquid joint is formed which prevents the escape of gas from the interior of the dome. The electrode E' is secured to a bar 22 which rests upon the top edge of the tank C. The tank B communicates through an opening or openings 24 with a trough F which communicates with a water supply pipe 25 and is provided with an overflow pipe 26 which extends up to the water line 11, so that, if the supply pipe 25 is open, the level of the water contained in the trough F and in the tank B will remain constant at the line 11. The tank C connects by an opening or openings 27 with a trough F' which is provided with a water supply pipe 28 and an overflow pipe 29 which rises to the water line 11, so that, if the water supply pipe 28 is open, the level of the liquid in the tank C remains constant at the line 11. It will be noticed that the line 10, which indicates the level of the liquid in the tank A, is somewhat lower down than the line 11 which indicates the level of the liquids in the tanks B C. The object of this arrangement is to oppose the passage of any portion of the electrolyte from the tank A through the diaphragms D D' into the tanks B C, which is effected by the tendency of the liquids in the tanks B C to flow into the tank A, which tendency is imparted to them by reason of their higher level.

If the tank A is charged with the solution of a salt such for instance as sodic chloride while the tanks B C are filled with water to the levels indicated by the lines 10 and 11 in Fig. 1 and a current of electricity is passed through the liquids contained in the tanks, the chlorine migrates into the tank B and is liberated at the electrode E, while the sodium migrates into the tank C where it combines with oxygen, setting free hydrogen, and the solution of the ions can be withdrawn by means of the stop-cocks 30, 31, and if a continuous stream of sodic chloride solution is caused to pass through tank A, while the level of the water in the tanks B C is maintained by keeping the supply pipes 25 and 28 open, the solutions of the ions can be withdrawn without interruption as long as the electric current is maintained. The gas set free in the tank B collects in the dome 20 and can be withdrawn by means of the pipe and valve 23.

A hydrometer H and a scale $h$ are provided to indicate the height of the concentrated solution which accumulates in the lower part of the tank C. The electrodes E E' extend below the level of the bottom edges of the diaphragms D D', but they terminate at some distance above the bottoms of the tanks B C, so that room is left for the solutions of the ions to settle beneath said electrodes and corrosion of the electrodes and of the diaphragms is obviated.

By means of the serrations $e$ sharp edges or points are produced on the surfaces of the electrodes whereby the electric action is facilitated and the danger that the electrodes will split or become disintegrated is materially reduced or almost entirely obviated.

What I claim as new, and desire to secure by Letters Patent, is—

1. The within described process for dissociating soluble salts into their acid and basic constituents by electrolysis which consists in providing a bath of the electrolyte and two independent bodies of liquid, establishing a dialytic communication between the bath and each of the independent bodies of liquid, maintaining the independent bodies of liquid at a higher level than the level of the bath and passing a current of electricity through the independent bodies of liquid and through the bath.

2. The within described process for dissociating soluble salts into their acid and basic constituents by electrolysis which consists in providing a bath of the electrolyte and two independent bodies of liquid, establishing a dialytic communication between the bath and each of the independent bodies of liquid, passing a continuous stream of the electrolyte through the bath, maintaining the independent bodies of liquid at a higher level than the level of the bath, passing a current of electricity through the independent bodies of liquid and through the bath and withdrawing the solutions of the ions from the independent bodies of liquid while the current of electricity is maintained.

3. The combination with the tanks A B C of dialytic diaphragms which form the communications between the tank A and the tanks B C, electrodes E E' suspended in the tanks B C and means for maintaining the liquids in the tanks B C at a higher level than that of of the liquid in the tank A, substantially as described.

4. The combination with the tank A, of two tanks B C which communicate with the tank A through dialytic diaphragms and extend beneath the bottom edges of said diaphragms, the supply pipe, $a$, and discharge pipe, $b$, communicating with the tank A at the same level, the trough F communicating with the tank B, the trough F' communicating with the tank C, the liquid supply pipes 25 and 28 leading into said troughs and the overflow pipes 26 and 29 rising in said troughs to a level above the level of the supply pipe $a$ and discharge pipe $b$, substantially as described.

5. The combination with the tanks A B C, the dialytic diaphragms which form communications between the tank A and tanks B C and the means for maintaining the liquids in the tanks B C at a higher level than that of the liquid in the tank A, of a dome 20 fitting into the top of the tank B, substantially as described.

6. The combination of the tank B, its dome 20 with its outlet 23, the serrated electrode E, the trough $f$, the inlet and outlet pipes 25 and 26, communications 24, outlet and valve 30, the tank C, trough $f'$, its inlet and outlet pipes 28 and 29, communications 24, the serrated electrode E' supported by the rod 22, the hydrometer H with its scale $h$, the outlet pipe and valve 31, the tank A provided with inlet and outlet pipes $a$ $b$ and situated between the tanks B C and the dialytic diaphragms D and D', substantially as described.

In testimony whereof I have hereunto set my hand in the presence of two subscribing witnesses.

HENRY S. BLACKMORE.

Witnesses:
WM. C. HAUFF,
E. F. KASTENHUBER.